Patented Dec. 7, 1943

2,336,369

UNITED STATES PATENT OFFICE 2,336,369

DISPERSION OF THERMOPLASTIC HYDROCARBONS

Rotheus B. Porter, Jr., Malden, Mass., assignor to Bennett Incorporated, Cambridge, Mass., a corporation of Massachusetts No Drawing. Application November 28, 1939, Serial No. 306,493

9 Claims. (Cl. 252—311.5)

This invention deals with aqueous dispersions of thermoplastic hydrocarbons, such as paraffin wax and asphalt, and more especially with such aqueous dispersions as are to be used for sizing papermaking and boardmaking stocks.

In preparing such dispersions, it is customary to incorporate saponifiable substance into the thermoplastic hydrocarbon and to commingle an aqueous solution of caustic soda, caustic potash, or equivalent alkali with the molten mixture of thermoplastic hydrocarbon and saponifiable substance to saponify such latter substance and thus to form soap in situ as stabilizer or protective colloid for the resulting aqueous dispersion of thermoplastic hydrocarbon.

When used for sizing various kinds of papermaking stock, it is important that the dispersions be capable of undergoing considerable dilution without agglomeration or coarsening of the dispersed particles, that is, without being broken. In order to realize substantially uniform distribution of the dispersed particles throughout the papermaking stock, as in a beater engine, the usual practice is to dilute the dispersion as purchased in concentrated form (i. e., at a solids content upwards of about 50%) to a solids content of, say, about 2% to 6%. In undergoing such extensive dilution, a dispersion or size will break, if poorly stabilized. In other words, agglomerates or coarse particles of the wax or other thermoplastic hydrocarbon will be generated in the dispersion during its dilution; and, when the particles are unduly coarse, the desired substantially uniform sizing effect on the stock may not be realized.

I have found that alkali metal pyrophosphate may advantageously be added to the aqueous solution of caustic soda, caustic potash, or equivalent alkali that is used for saponifying the saponifiable substance compounded or melted with the thermoplastic hydrocarbon preparatory to dispersion of the hydrocarbon. It is thereby possible to produce readily aqueous dispersions that show no tendency whatever to agglomerate or break at a dilution at which they are best commingled with papermaking stock, for instance, a dilution as low as about 1% solids content. Because dilution does not cause premature breaking of the dispersions prepared accordant with the present invention, the diluted dispersions containing substantially only very finely dispersed particles may be disseminated substantially uniformly throughout the papermaking stock and finally fixed to the stock in the desired fine particle size by the addition of alum or equivalent agent capable of precipitating soap and pyrophosphate stabilizer. Even when the dispersions hereof are diluted to the breaking point, that is, to a solids content distinctly less than 1%, the resulting broken or agglomerated dispersion contains in suspension therein particles finer than a dispersion similarly prepared and diluted but in the absence of the pyrophosphate stabilizer.

The value of pyrophosphate in the aqueous dispersions hereof is probably attributable to its peptizing action and the peptizing action of such pyrophosphoric acid as may be liberated in the course of forming the dispersion. In this latter connection, it might be remarked that a subordinate but perhaps noteworthy part of the pyrophosphate is probably consumed in saponifying a small portion of the saponifiable substance incorporated into the thermoplastic hydrocarbon melt and that the saponifying reaction is attended by the liberation of pyrophosphoric acid.

Since tetrasodium pyrophosphate has unduly limited solubility in caustic soda solution of substantial strength, it is preferable when using caustic soda solution as saponifying agent for the soap-forming substance melted with the thermoplastic hydrocarbon to dissolve in such solution the tetrapotassium pyrophosphate, which latter salt is quite soluble in caustic soda solution of such concentration as is desired for saponifying purpose. Generally speaking, it is preferable to add to the saponifying solution, which may be a caustic soda solution of a strength up to about 10%, about 0.25% to 2.0% of the tetrapotassium pyrophosphate, based on solution, which amount of pyrophosphate is completely dissolved and enhances the stability of the resulting dispersion to the desired very marked degree. When using caustic potash solution as saponifying agent, for instance, a solution up to about 10% strength, it is possible to dissolve tetrasodium pyrophosphate as well as tetrapotassium pyrophosphate in substantial amount in such solution, wherefore, either the sodium or potassium pyrophosphate may be dissolved in amount of, say, about 0.5% to 2.0% in such solution before such solution is admixed as the saponifying and dispersing medium with the thermoplastic hydrocarbon melt containing an appropriate amount of saponifiable substance.

While not limited thereto, the dispersions of the present invention are preferably formed with montan wax and/or pyroligneous residue, such as described in United States Patent No. 2,093,337, as the saponifiable or soap-forming substance, for the particular soap stabilizer thus formed enables the preparation of dispersions having greater fluency at a given high solids content and much better stabilizing effect on the dispersions upon extensive dilution with water than dispersions containing various other soap stabilizers, for instance, the soaps of such fatty acids as stearic or oleic. I shall now give typical examples of dispersions prepared, pursuant to the present invention, with an aqueous solution of alkali containing pyrophosphate.

Paraffin wax dispersion

Paraffin wax and montan wax in the amounts of 85 and 15 parts, respectively, may be melted together and the melted mixture heated to about 240° F. A caustic potash solution of about 0.25% to 0.5% strength may be separately prepared; and in such solution may be dissolved about 1% sodium pyrophosphate ($Na_4P_2O_7$) or about 1% potassium pyrophosphate ($K_4P_2O_7$), based on solution. In this particular example, using caustic potash solution as the saponifying and dispersing medium, it is preferable to employ the sodium pyrophosphate by reason of its lower cost. The caustic potash solution containing sodium pyrophosphate may be heated to about 180° F. and then commingled with the melted waxes at about 240° F. in a suitable mixing or dispersing apparatus, for instance, a dispersing machine of the type disclosed in United States Patent No. 1,792,067, which latter machine comprises an inclined tubular mixing and dispersing shell into whose upper end portion a stream of the melted mixture of waxes and a stream of the heated solution may be fed at controlled rates and into whose intermediate portion a stream of diluting water may be fed at a rate to ensure the emergence of a stream of finished dispersion of the desired solids content and fluency from the lower end of the shell. At the zone of confluence of the two streams at the upper end portion of the shell, the streams are vigorously agitated to form a single stream of dispersion which is vigorously agitated in the course of its flow down through the shell, including the intermediate zone of the shell at which the stream of dispersion may receive a suitable amount of diluting water. The materials may be fed into the dispersing machine in such proportions as to yield a paraffin wax dispersion of a solids content up to about 50%, at which high solids content the dispersion is quite fluent and may be shipped to customers in drums.

Rosin-wax dispersion

According to this example, rosin may constitute a major portion and paraffin wax a minor portion of the material being dispersed. Thus, the melted mixture may consist of 80 parts of wood or gum rosin, 17 parts of paraffin wax, and 3 parts of montan wax. A relatively small amount of the montan wax is employed for the reason that the rosin is saponifiable and may hence furnish a large or even major portion of the soap stabilizer. Some montan wax is, however, desired, as it serves the purpose of rendering the molten paraffin wax miscible with the rosin and the further purpose of furnishing soap-stabilizer of far greater stabilizing potency than rosin soap. The melted mixture may be heated to about 250° to 260° F. and commingled in appropriate proportion with a hot aqueous solution containing caustic soda and potassium pyrophosphate ($K_4P_2O_7$) in suitable concentration, for instance, an aqueous solution at about 100° to 120° F. containing about 4% to 7% caustic soda and about ½% of the potassium pyrophosphate. The melted mixture and hot aqueous solution may be commingled in a dispersion machine of the type disclosed in Patent No. 1,792,067 with such relative rates of feed of the streams of the melted mixture and hot solution as to produce a dispersion of a solids content ranging from about 30% to 70%. When a dispersion machine of the type disclosed in Patent No. 1,792,067 is employed, a large portion of the rosin in the resulting dispersion may be in free or unsaponified condition, especially when the materials fed into the machine remain in the machine for a very short period of time, that is, for a matter of seconds, say, 6 to 10 seconds. It is possible to replace a part or all of the montan wax in this example by another suitable saponifiable material, for instance, such pyroligneous residue as is described in United States Patent No. 2,093,337.

Asphalt dispersion

In this example, asphalt having a melting point of about 130° to 160° F. may be melted in the amount of 95 parts with 5 parts of montan wax and the melted mixture heated to about 230° F. The melted mixture may then be commingled in the above-described dispersion machine with an aqueous solution heated to about 170° F. and containing about 0.25% to 0.5% caustic soda and about 1% potassium pyrophosphate ($K_4P_2O_7$). The resulting dispersion is quite fluent when prepared from such proportions of the melted mixture and the aqueous saponifying and dispersing medium as to yield a dispersion product having a solids content of about 55%.

Using the saponifying solution of the present invention containing pyrophosphate, it is possible readily to produce concentrated aqueous dispersions having an average particle size less than about one micron and capable of being diluted to a solids content as low as about 1% while substantially retaining such fine particle size. Thus, aqueous dispersions of such thermoplastic hydrocarbons as paraffin wax, scale wax, amorphous waxes, and various other kinds of mineral waxes and asphalts may be prepared accordant with the present invention at a solids content of about 30 to 55%; and when, in accordance with the present invention, the soap of montan wax serves as the stabilizer for the dispersion and the dispersion contains pyrophosphate, which is added to the solution of caustic alkali used in forming such soap stabilizer, not only is it possible to realize a concentrated aqueous dispersion of the desired fluency but, upon dilution of the dispersion with water, its extremely fine particle size, whose average may be no greater than one micron, remains substantially unchanged at dilutions as low as about 1%. Rosin-wax and rosin-asphalt dispersions containing the soap of montan wax may be prepared with the desired fluency at as high as 70% solids content; and their stability and fine particle size characteristics are similar to those of the other dispersions already described.

All of the foregoing dispersions are especially useful in the sizing of fibrous stocks intended for papermaking and boardmaking purposes. Thus, the wax and the rosin-wax dispersions may be added to papermaking stock intended for bond, writing, and similar papers, in which case they may be precipitated on and fixed to the stock with alum or equivalent precipitant. They may also be used in the sizing of paper by the so-called calender-sizing and tub-sizing processes. The asphalt dispersion may serve as the sizing composition for boards, heavy wrapping paper, and other paper products wherein dark color is of no serious moment. It is also of value for road-binding purpose. In all of these spheres of use, the high stability of the dispersions hereof upon extensive dilution with water is a most important property, for all these uses generally involve extensive dilution of the dispersions; and premature agglomeration or breaking of the dispersion during dilution detracts from the utility or qualities of the final product in which the dispersion is to exercise a sizing, water-repelling, binding, or other effect.

As previously stated, the dispersions hereof may be prepared by adding various soap-forming substances, for instance, any one or more of the various fatty acids to the thermoplastic hydrocarbon melt even though particular soap-forming substances have been indicated as being preferable in that they lead to the best soap stabilizers. While alkali solutions of various strengths can be used for saponifying the soap-forming substance in the course of preparing the dispersions hereof, it is generally preferable to employ caustic alkali solutions, such as caustic soda and caustic potash solutions, of a strength up to about 10% as a saponifying and dispersing medium. When it is desirable to arrive at the most concentrated dispersions having a given degree of fluency, using montan wax as the soap-forming ingredient, it is preferable to employ caustic potash solution as the saponifying and dispersing medium, for the sodium soap of montan wax, evidently being harder than the potassium soap of montan wax, leads to lower fluency of dispersion at a given solids content than the potassium soap of montan wax. The range of strength or concentration of sodium or potassium pyrophosphate desired for the purposes hereof is about 0.25% to about 2.0%; and while it is possible to use more pyrophosphate, yet there is no such additional significant increase in the stability or fine particle size of the dispersion to warrant the further expense. In speaking about the dispersion as containing such percentage range of pyrophosphate, I mean pyrophosphate or its chemical equivalent, that is, such pyrophosphoric acid as may be liberated from the pyrophosphate by reason of the reaction of the latter with saponifiable constituent of the melt.

I claim:

1. In the preparation of an aqueous dispersion of a thermoplastic hydrocarbon involving the melting of such hydrocarbon with montan wax and the commingling of the melted mixture with an aqueous solution of a caustic alkali up to about 10% strength, that improvement which comprises dissolving an alkali metal pyrophosphate in the amount of about 0.25% to 2.0% in said aqueous solution of caustic alkali preparatory to commingling it with said melted mixture and thereby promoting a dispersion of said hydrocarbon in said aqueous solution containing as stabilizer for the dispersion both said alkali metal pyrophosphate and soap resulting from the saponification of said montan wax by said caustic alkali.

2. In the preparation of an aqueous dispersion of paraffin wax involving the melting of such wax with montan wax and the commingling of the melted mixture with an aqueous solution of a caustic alkali up to about 10% strength, that improvement which comprises dissolving an alkali metal pyrophosphate in the amount of about 0.25% to 2.0% in said aqueous solution of caustic alkali preparatory to commingling it with said melted mixture and thereby promoting a dispersion of said paraffin in said aqueous solution containing as stabilizer for the dispersion both said alkali metal pyrophosphate and soap resulting from the saponification of said montan wax by said caustic alkali.

3. In the preparation of an aqueous dispersion of asphalt wax involving the melting of such wax with montan wax and the commingling of the melted mixture with an aqueous solution of a caustic alkali up to about 10% strength, that improvement which comprises dissolving an alkali metal pyrophosphate in the amount of about 0.25% to 2.0% in said aqueous solution of caustic alkali preparatory to commingling it with said melted mixture and thereby promoting a dispersion of said asphalt in said aqueous solution containing as stabilizer for the dispersion both said alkali metal pyrophosphate and soap resulting from the saponification of said montan wax by said caustic alkali.

4. A fluent aqueous dispersion of paraffin wax having a solids content ranging from about 30% to 50% and an average particle size less than about one micron and stabilized by both montan wax soap and an alkali metal pyrophosphate, the matter ranging in concentration from about 0.25% to 2% and serving to maintain said dispersion at said average particle size when said dispersion is diluted with water to a solids content as low as about 1%.

5. A fluent aqueous dispersion of asphalt having a solids content ranging from about 30% to 55% and an average particle size less than about one micron and stabilized by both montan wax soap and an alkali metal pyrophosphate, the latter ranging in concentration from about 0.25% to 2% and serving to maintain said dispersion at said average particle size when said dispersion is diluted with water to a solids content as low as about 1%.

6. A fluent aqueous dispersion of a thermoplastic hydrocarbon having a solids content ranging from about 30% to 55% and an average particle size less than about one micron and stabilized sufficiently by both the sodium soap of montan wax and potassium pyrophosphate to be capable of being diluted with water to a solids content of as low as about 1% while substantially retaining said average particle size.

7. A fluent aqueous dispersion of a thermoplastic hydrocarbon having a solids content ranging from about 30% to 55% and an average particle size less than about one micron and stabilized by the sodium soap of montan wax and potassium pyrophosphate, the latter ranging in concentration from 0.25% to 2% and serving to maintain said dispersion at said average particle size when said dispersion is diluted with water to a solids content as low as about 1%.

8. A fluent aqueous dispersion of a thermoplastic hydrocarbon having a solids content ranging from about 30% to 55% and an average particle size less than about one micron and stabilized sufficiently by both potassium soap of montan wax and sodium pyrophosphate to be capable of being diluted with water to a solids content of as low as about 1% while substantially retaining said average particle size.

9. A fluent aqueous dispersion of a thermoplastic hydrocarbon having a solids content ranging from about 30% to 55% and an average particle size less than about one micron and stabilized by both potassium soap of montan wax and sodium pyrophosphate, the matter ranging in concentration from 0.25% to 2% and serving to maintain said dispersion at said average particle size when said dispersion is diluted with water to a solids content as low as about 1%.

ROTHEUS B. PORTER, JR.